US008062170B2

(12) United States Patent
West et al.

(10) Patent No.: US 8,062,170 B2
(45) Date of Patent: Nov. 22, 2011

(54) THERMAL PROTECTION OF AN ELECTRIC DRIVE SYSTEM

(75) Inventors: Stephen T. West, New Palestine, IN (US); Wei D. Wang, Troy, MI (US); Brian A Welchko, Torrance, CA (US); Steven E. Schulz, Torrance, CA (US); Peter E. Wu, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1089 days.

(21) Appl. No.: 11/863,592

(22) Filed: Sep. 28, 2007

(65) Prior Publication Data
US 2009/0088294 A1 Apr. 2, 2009

(51) Int. Cl.
*B60W 10/08* (2006.01)
*F16H 59/64* (2006.01)

(52) U.S. Cl. .............................................. 477/3; 477/98
(58) Field of Classification Search .................... 903/930
See application file for complete search history.

(56) References Cited

U.S. PATENT DOCUMENTS

| | | | |
|---|---|---|---|
| 5,931,757 A | 8/1999 | Schmidt | |
| 5,995,887 A | 11/1999 | Hathaway | |
| 6,463,892 B1 | 10/2002 | Russell | |
| 6,598,195 B1 | 7/2003 | Adibhatla | |
| 6,701,282 B2 | 3/2004 | Ting | |
| 6,724,313 B2 | 4/2004 | Sato | |
| 6,759,946 B2 | 7/2004 | Sato | |
| 6,786,639 B2 | 9/2004 | Covi | |
| 6,832,148 B1 | 12/2004 | Bennett | |
| 6,868,318 B1 | 3/2005 | Cawthorne | |
| 7,154,236 B1 | 12/2006 | Heap | |
| 2002/0193921 A1 | 12/2002 | Reese, II | |
| 2003/0076233 A1 | 4/2003 | Sato | |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0178130 A1 | 8/2005 | Van Gilder | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |

(Continued)

OTHER PUBLICATIONS

U.S. Appl. No. 11/669,439, Wang.

*Primary Examiner* — Edwin A Young

(57) ABSTRACT

Temperature of an electric drive is regulated to prevent undesirable thermal effects. Temperature conditions of the electric drive system are monitored and torque of the electric drive system is limited based on the temperature conditions.

8 Claims, 3 Drawing Sheets

U.S. PATENT DOCUMENTS

| | | | |
|---|---|---|---|
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0112412 A1 | 4/2009 | Cawthorne |
| 2009/0118917 A1 | 5/2009 | Sah |
| 2009/0144002 A1 | 6/2009 | Zettel |

THERMAL PROTECTION OF AN ELECTRIC DRIVE SYSTEM

TECHNICAL FIELD

The present invention is related to thermal management in powertrains having an electric drive system.

BACKGROUND

It is known to utilize electric drive systems in vehicle powertrains to drive or boost power at an output shaft. In addition, it is desirable to recover kinetic energy of the vehicle and store such recovered energy in energy storage device. Electric motors of electric drive systems have provided one convenient method for this bi-directional flow of energy to and from an output shaft. One aspect of utilizing such an electric drive system is managing the buildup of heat within system components. Electrical components are frequently sensitive to over temperature conditions, and it is beneficial to operate these components at temperatures that promote efficient operation and avoid undesirable thermal effects.

SUMMARY

A method for regulating the temperature of an electric drive includes monitoring temperature conditions at predetermined locations in the electric drive system and attenuating maximum allowable torque of the electric drive system based on the monitored temperature conditions. Preferably, the predetermined locations include a power inverter module and an electric motor assembly.

BRIEF DESCRIPTION OF THE DRAWINGS

One or more embodiments will now be described, by way of example, with reference to the accompanying drawings, in which.

DETAILED DESCRIPTION

Figure 1:
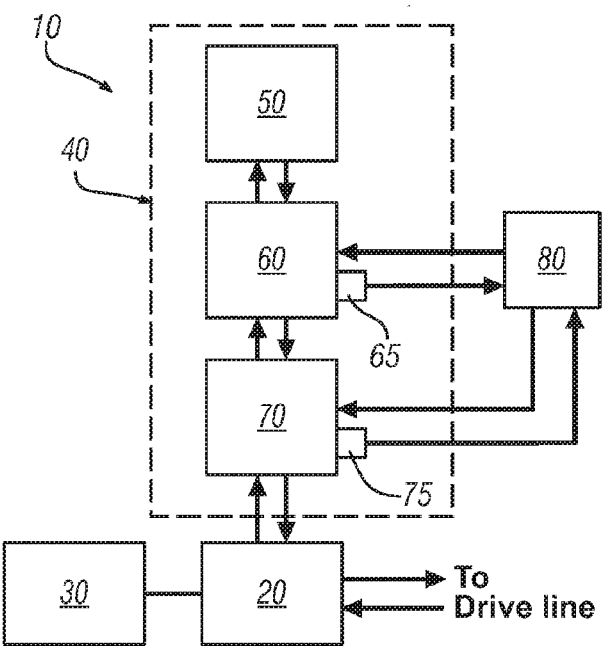
FIG. 1 is a block diagram of an exemplary electric drive system and control in accordance with the present disclosure.

Referring now to the drawings, wherein the showings are for the purpose of illustrating certain exemplary embodiments only and not for the purpose of limiting the same, FIG. 1 illustrates a hybrid drive system 10 which has been constructed in accordance with the present disclosure. The hybrid drive system 10 illustrates a usage of an electric drive system 40, an internal combustion engine 30, and a transmission assembly 20. The transmission assembly 20 provides output power to a driveline via an output shaft (not separately illustrated). The electric drive system 40 includes an energy storage device 50, a power inverter module 60, an electric motor assembly 70, and a control module 80. Energy storage device 50 can be a battery or bank of batteries, but it may be any electrical or electrochemical storage device and is not intended to be limited thereto. Power inverter module 60 switches AC electrical power to DC and DC electrical power to AC. Power inverters are well known in the art and will not be described in detail herein. Electric motor assembly 70 utilizes an electric motor in a motoring mode to convert AC electrical power into rotational power in the form of a spinning shaft. The same electric motor assembly may operate the electric motor in a generating mode, accepting rotational power through the spinning shaft and generating AC electrical power. This ability of an electric motor to operate in motoring or generating modes is well known in the art and will not be described in detail herein. The torque output of electric motor assembly 70 is defined as either the torque applied by the motor to the output shaft or the torque accepted by the electric motor from the output shaft. The ability of the electric motor assembly 70 to operate as a motor or generator enables the electric drive system 40 to operate in two manners: first, the system may provide power to a driveline from stored energy; second, the system may convert power from a driveline to stored energy. In order to provide power to the driveline, energy storage device 50 supplies DC electric power to power inverter module 60. Power inverter module 60 converts the DC electric power to AC electric power. This AC power is used to drive electric motor assembly 70 and, subsequently, transmission assembly 20. In order to convert rotational kinetic energy from the driveline to stored energy, the electric motor assembly 70 receives rotational energy from transmission assembly 20 and converts the energy to AC electrical power. This AC electrical power is transferred from electric motor assembly 70 to power inverter module 60 and is, thereby, converted to DC electrical power. This DC electrical power is used to charge the energy storage device 50.

As with any electrical process, some of the electrical power is converted in the electric drive system 40 to heat. Primary sources of electrically generated heat comes from, for example, switching losses in the inverter electronics, simple ohmic ($I^2R$) losses and motor losses predominantly in motor windings. In addition, frictional forces in the electric motor assembly 70 also create heat in the electric drive system 40. Heat generated in or transferred to electric drive system 40 may raise the temperature of all of the components in the system, and elevated temperatures pose a risk of thermal damage. Thermal damage occurs at a particular point in a component when the temperature at that point exceeds the thermal limit of a particular material or structure. Different operating conditions of the overall application in which electric drive system 40 is used may create various different localized higher temperatures in particular components. Whether electric drive system 40 is in an over temperature condition such that components are at thermal risk from localized higher temperatures can be difficult to monitor without a multitude of distributed sensors in the system. Control module 80 instead samples temperature data from predetermined indicative components, preferably power inverter module 60 and electric motor assembly 70, processes this temperature data, and models the overall temperature condition of the system. Temperature sensors 65 and 75 are located on the power inverter module 60 and electric motor assembly 70, respectively, to gather temperature data for use by control module 80. The temperature condition developed from the sensor data is then utilized by programmed algorithms within control module 80. These algorithms are programmed with threshold temperature condition set points, which, when exceeded, cause control module 80 to begin modulation of the electric motor assembly 70 by imposing certain torque control of the motor of the electric motor assembly 70. Under acceptable thermal operating conditions, a maximum continuous torque function is applied to the electric motor assembly 70 as a function of temperature condition of the electric drive system 40 which effectively makes available torque up to the torque capability of the electric motor. Under unacceptable thermal operating conditions, the maximum continuous torque function is attenuated as described further herein below. Under unacceptable thermal operating conditions, or over temperature conditions, the maximum continuous torque function introduces an increasingly restrictive torque reduction factor into the controlling logic of the electric motor assembly 70, thereby reducing the motor power throughput. As the temperature reaches the threshold temperature condition set point, a relatively minor reduction factor is introduced to the control logic whereby the maximum torque allowable motor torque is reduced relative to the motor torque capability. As the temperature continues to increase past the threshold temperature condition set point, the attenuation of motor torque becomes more aggressive and hence the reduction factor becomes more significant. In some embodiments, an indicator light or driver warning system is utilized to provide information to the driver in the event that one of the set points is reached. And, additional set points may correspond to even higher temperature conditions. In the event that the temperature condition exceeds a critical temperature condition set point, control module 80 acts to completely shut off the electric drive system 40. The shut off of the electric drive system 40 may take the form of setting the maximum torque output of the electric motor assembly to zero or cutting power to the electric drive system 40 completely. The shut off is ended when control module 80 determines that the temperature condition of electric drive system 40 has decreased to a lower reset threshold. Electrical power running through the system and the operation of the electric motor assembly 70 are the primary sources of heat in the electric drive system 40, and in either the event of system modulation or shut down, reducing the motor torque of the system reduces the amount of heat generated in the system. In the great majority of situations, this reduction in heat generated in electric drive system 40 will allow the system to dissipate heat leading to reduced temperatures in the system and allowing for recovery to normal operation.

In the exemplary single motor system described above, any motor torque attenuations are desirably accounted for in the overall control strategy of the hybrid drive system. For example, maintaining a desired driveline torque in the event of attenuations of motor torque would require a rebalancing of the torque required from the engine 30. More particularly, if the motor of motor assembly 70 is operating in a motoring mode and is subjected to torque attenuation, the overall control strategy may adjust engine torque higher in order to maintain driveline torque at a desired level. Similarly, if the motor of motor assembly 70 is operating in a generating mode and is subjected to torque attenuation, the overall control strategy may adjust engine torque lower in order to maintain driveline torque at a desired level.

Figure 6:
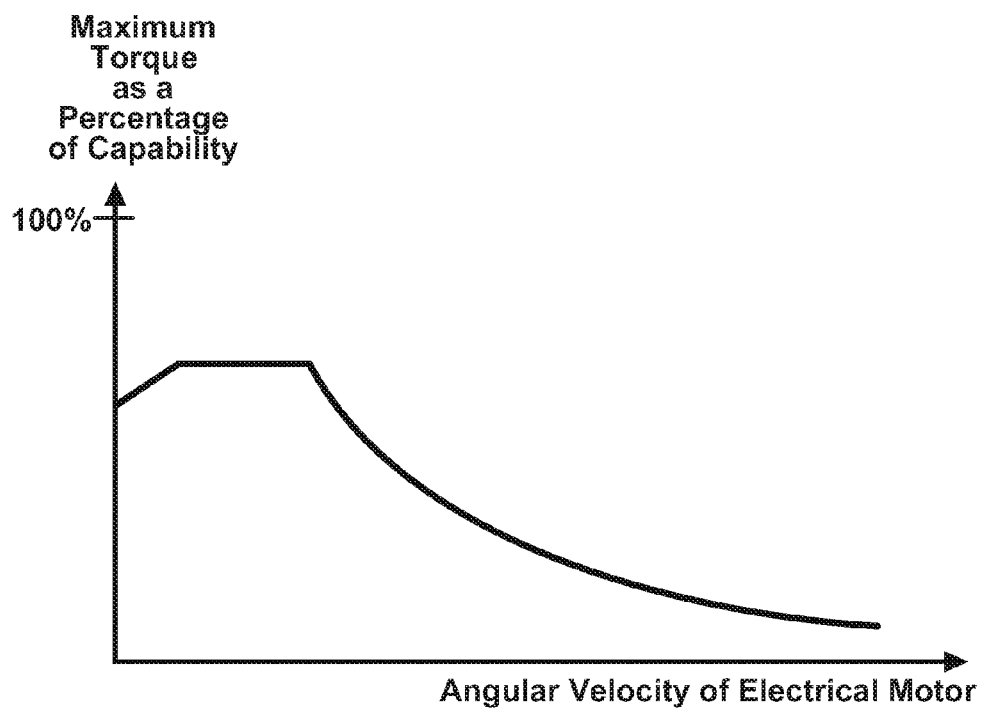
FIG. 6 is an exemplary plot of maximum torque allowed versus angular velocity of the electric motor assembly related to an exemplary sensor diagnostic and control in accordance with the present disclosure.

Control module 80 may additionally utilize the gathered temperature data for a multitude of uses. Such additional uses may include adaptation of the various temperature set points to various conditions. For example, a particular modulation curve might be used when high environmental (i.e. ambient) temperatures are indicated and a different curve might be used when low environmental temperatures are indicated. When used within a hybrid drive system 10, the control module could initiate changes in a hybrid control strategy such that lower demands are placed upon the electric drive system 40. Another exemplary use that the control module 80 might make with the temperature data includes sensor malfunction diagnostics and adaptive controls. If a temperature sensor is determined to be malfunctioning, control module 80 can operate to impose a maximum continuous torque function as a function of electric motor angular velocity in order to decrease the likelihood of thermal damage until the malfunctioning sensor can be replaced. An exemplary embodiment of such a maximum continuous torque function utilized in the case of sensor malfunction is depicted in FIG. 6.

Figure 2:
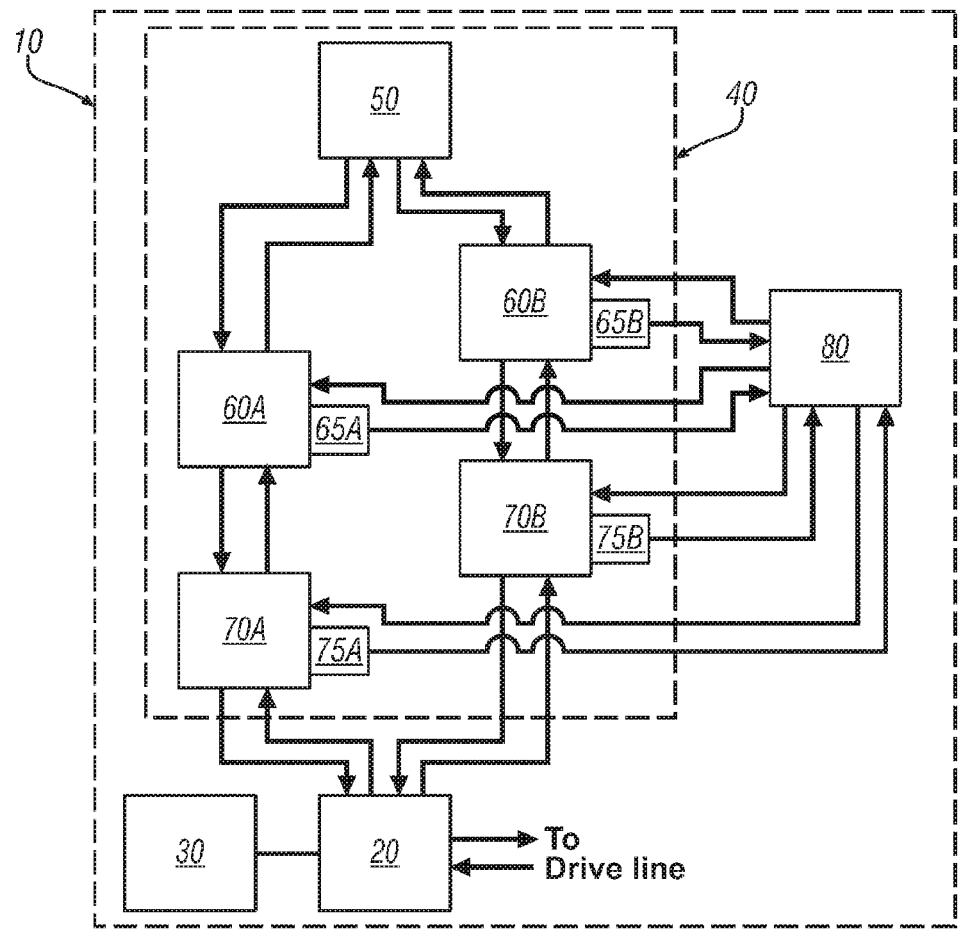
FIG. 2 is a block diagram of an alternate exemplary electric drive system and control in accordance with the present disclosure.

FIG. 2 illustrates an additional embodiment wherein electric drive system 40 may utilize two electric motor assemblies. Power inverter modules 60A and 60B are electrically coupled to electric motor assemblies 70A and 70B, respectively. Sensors 65A and 65B are operable to monitor the temperature of power inverter modules 60A and 60B, respectively, and sensors 75A and 75B are operable to monitor the temperature of electric motor assemblies 70A and 70B, respectively. Sensors 65A, 65B, 75A, and 75B, collectively, operate to gather temperature data for use by control module 80 in order to calculate an overall temperature condition of electric drive system 40. Control module 80 utilizes the temperature condition to determine whether modulation of the electric motor assemblies 70A and 70B or complete shut down of electric drive system 40 is appropriate. In one particular embodiment, control module 80 is operative to modulate or shut down either electric motor assembly 70A or electric motor assembly 70B if the localized temperature readings only justify action upon one portion of system 40.

As with the exemplary single motor system previously described, any motor torque attenuations are desirably accounted for in the overall control strategy of the hybrid drive system. And, through such control strategies, the driveline torque is thereby maintained at the desired level. However, in known dual motor systems, for example in a two-mode, compound-split electrically variable transmission such as disclosed in U.S. Pat. No. 5,931,757 which is incorporated herein by reference, the torque attenuations applied to one motor may be accounted for in the other motor torque, the engine torque or a combination thereof. Thus, in a hybrid drive system including two motor assemblies, torque attenuation of one motor may be redistributed to the other motor, to the engine or split therebetween in accordance with the overall control strategy of the hybrid drive system.

Figure 3:
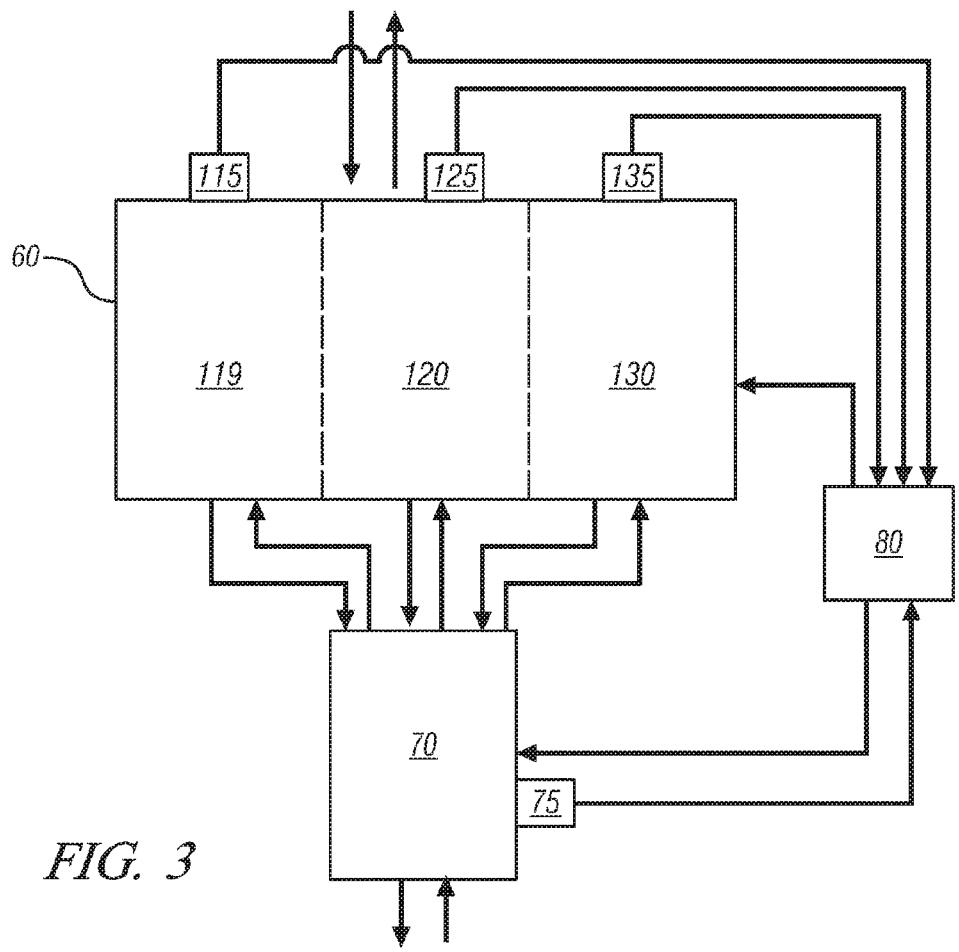
FIG. 3 illustrates a three-phase power inverter module in accordance with the present disclosure.

FIG. 3 depicts a schematic diagram of an embodiment of a three-phase power inverter module apparatus. Devices operating under AC electrical power frequently operate under three phase power. In this embodiment of electric drive system 40, three phase AC electric power is used between the power inverter module 60 and electric motor assembly 70. In order to be operative in three phase electric power, power inverter module 60 utilizes three separate internal electrical circuits 110, 120, and 130, each operating in a different phase. Each electrical circuit 110, 120, and 130 is paired with a corresponding temperature sensor 115, 125, and 135. Temperature sensors 115, 125, and 135 take the place of sensor 65 utilized in the embodiment illustrated in FIG. 1. At least one temperature sensor 75 continues to be utilized to monitor electric motor assembly 70. By using a sensor for each individual electrical circuit, the temperature of the power inverter module 60 is more accurately monitored by control module 80. In one embodiment of the invention, control module 80 will convert the three inputs from temperature sensors 115, 125, and 135 to an operative value to approximate the temperature condition of power inverter module 60. The operative value may be the maximum reading of the three sensor readings, an average of the three sensor readings, or some other function of the data. In other embodiments, the three inputs can be processed by various algorithms. In addition, control module 80 may operate diagnostic routines (such as comparative, correlative and rationality checks) for the purpose of determining whether any of temperature sensors 115, 125, and 135 are malfunctioning. For example, a preferred method of diagnosing sensor malfunctions is set forth in commonly assigned U.S. patent application Ser. No. 11/669,439 filed on Jan. 31, 2007, which is incorporated herein by reference. The temperature data from malfunctioning sensors will not be used to determine temperature condition of electric drive system 40. The operative value from sensors 115, 125, and 135 and the readings from sensor 75 are utilized by control module 80 as described in the aforementioned embodiments to determine whether modulation or shut down of system 40 is appropriate.

Figure 4:
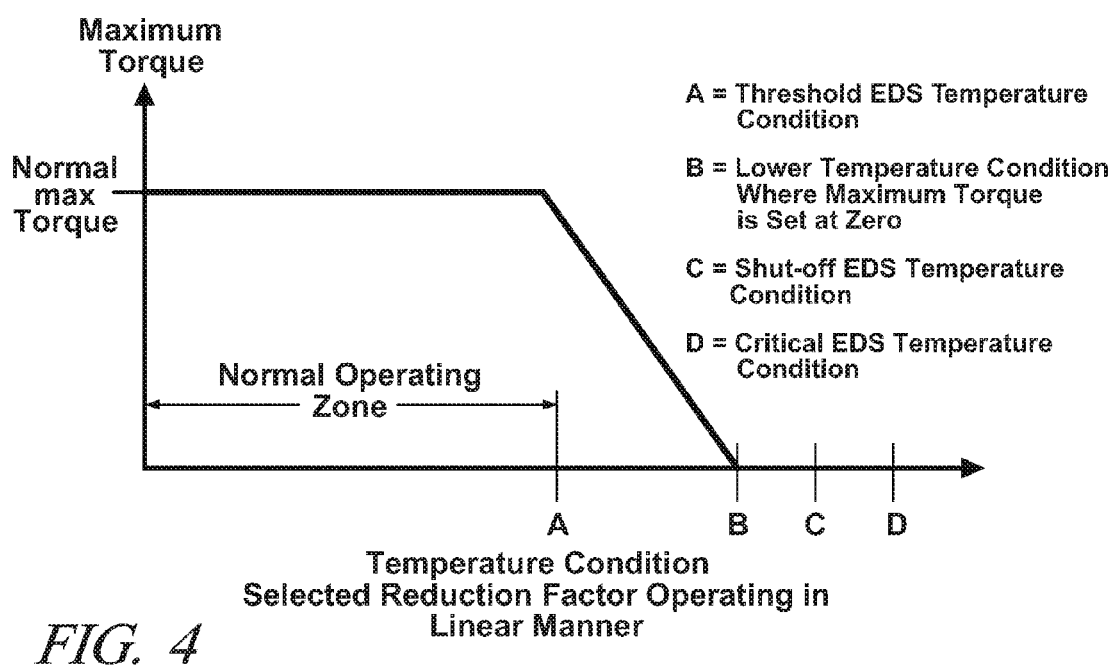
FIG. 4 is an exemplary plot of maximum torque allowed versus temperature conditions of the electric drive system in accordance with the present disclosure.
Figure 5:
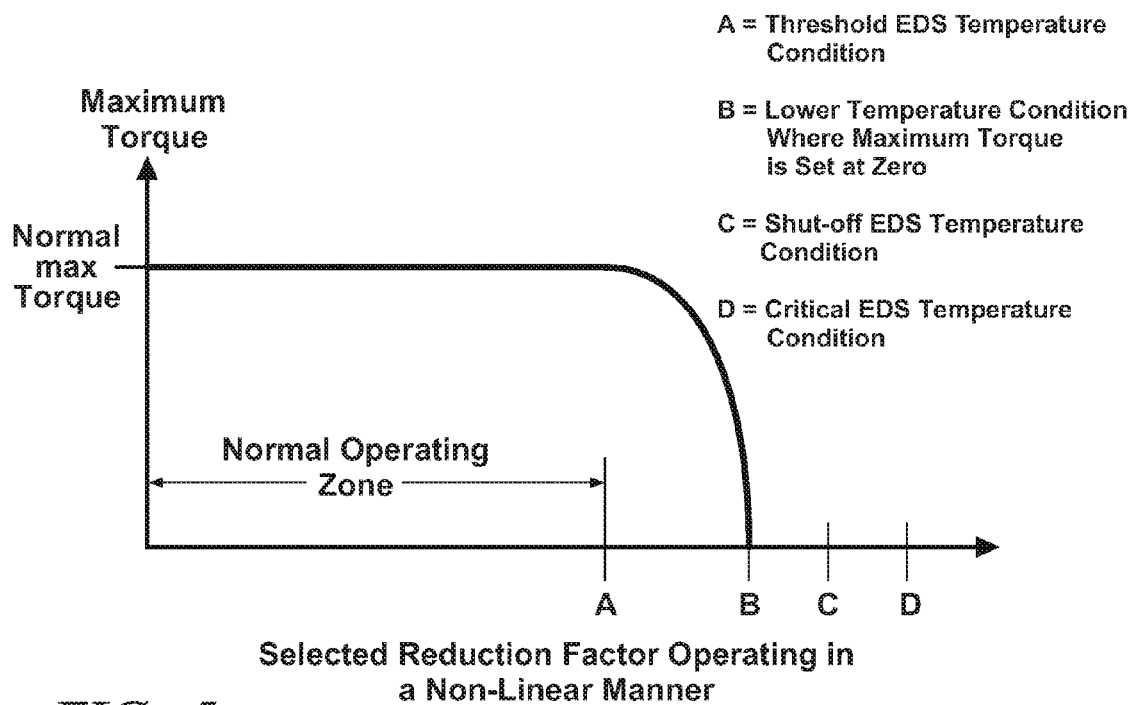
FIG. 5 is an alternate exemplary plot of maximum torque allowed versus temperature conditions of the electric drive system in accordance with the present disclosure.

FIGS. 4 and 5 are plots used to show temperature condition set points programmed into control module 80 used to operate the thermally protective aspects of the invention. Control module 80, as aforementioned, receives temperature data from various temperature sensors, preferably with at least one temperature sensor monitoring the motor assembly(s) and one temperature sensor monitoring the inverter module(s). Electric drive system temperature conditions are compared to preprogrammed set points to determine what, if any, torque attenuation control should be imposed upon the electric motor of electric drive system 40. So long as the temperature condition of electric drive system 40 remains in the normal thermal operating zone, the control module 80 has no modulating effect upon the electric drive system 40. If the temperature condition of the electric drive system 40 reaches a programmed threshold temperature condition set point, the control module 80 begins to impose a selected reduction of the maximum torque that the electric motor may apply to or receive from the transmission assembly 20. The algorithm used to impose the selected reduction factor may model a simple linear reduction in the maximum allowable motor torque or may take a more complex form. FIG. 3 represents an imposition of a linear reduction in allowable torque whereas FIG. 4 represents an imposition of a parabolic reduction in allowable torque. Different torque limiting curves may be useful depending upon the system usage anticipated. The algorithm may gradually or drastically attenuate the maximum allowable torque of the electric drive system 40 once the threshold temperature condition set point is reached. When the temperature condition of electric drive system 40 gets to some even higher level, the algorithm will have reduced the maximum torque setting to zero. Preferably, should the temperature condition of the electric drive system 40 continue to rise to a programmed shut-off temperature condition set point, the control module 80 may in some embodiments cut all electrical power through inverter module 60 and electric motor assembly 70 to protect the electric drive system 40 and its components from reaching a critical temperature condition or thermal event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for regulating the temperature of an electric drive system comprising:
   monitoring a temperature sensor located to measure an environmental temperature;
   monitoring temperature conditions at predetermined locations in the electric drive system; and
   attenuating maximum allowable torque of the electric drive system based on the monitored temperature conditions;
   wherein attenuating maximum allowable torque of the electric drive system based on the monitored temperature conditions comprises imposing a maximum continuous torque function upon the torque output of said electric motor assembly; and
   wherein said maximum continuous torque function is variable based upon the measured environmental temperature.

2. A method for regulating the temperature of an electric drive system comprising:
   monitoring temperature conditions at predetermined locations in the electric drive system; and
   attenuating maximum allowable torque of the electric drive system based on the monitored temperature conditions;
   wherein attenuating maximum allowable torque of the electric drive system based on the monitored temperature conditions comprises imposing a maximum continuous torque function upon a torque output of said electric drive system; and
   wherein said maximum continuous torque function reduces said maximum torque output of said electric drive system in response to increasing temperature conditions such that said maximum torque output of said electric drive system is reduced to zero before a critical temperature condition is attained.

3. A method for regulating the temperature of an electric drive system comprising:
   monitoring temperature conditions at predetermined locations in the electric drive system; and
   attenuating maximum allowable torque of the electric drive system based on the monitored temperature conditions;
   wherein attenuating maximum allowable torque of the electric drive system based on the monitored temperature conditions comprises imposing a maximum continuous torque function upon a torque output of said electric drive system; and
   wherein said maximum continuous torque function effects a shut-off of all electrical power to said electric drive system when said temperature conditions exceed a predetermined shut-off temperature condition set point.

4. A method for regulating the temperature of an electric drive system comprising:
   monitoring temperature conditions at predetermined locations in the electric drive system;
   validating said monitored temperature conditions; and
   attenuating maximum allowable torque of the electric drive system based on the monitored temperature conditions; and
   wherein said predetermined locations comprise a power inverter module and an electric motor assembly;
   wherein attenuating maximum allowable torque of the electric drive system based on the monitored temperature conditions relies upon validated monitored temperature conditions; and
   wherein attenuating maximum allowable torque of the electric drive system based on the monitored temperature conditions comprises imposing a maximum continuous torque function upon the torque output of said electric motor assembly as a function of electric motor assembly angular velocity if said monitored temperature conditions cannot be validated.

5. A method for regulating the temperature of an electric drive system comprising a power inverter module and an electric motor assembly, said method comprising:
monitoring temperatures at said power inverter module and said electric motor assembly;
determining a temperature condition from said monitored temperatures;
imposing a maximum continuous torque function upon the torque output of said electric motor assembly effective to progressively restrict the available torque output of said electric motor assembly as a function of an increasing temperature condition; and
imposing a maximum continuous torque function upon the torque output of said electric motor assembly as a function of electric motor assembly angular velocity if said temperature condition cannot be determined.

6. An electric drive system comprising:
an energy storage device;
a power inverter module;
an electric motor assembly;
a plurality of temperature sensors positioned to monitor temperature conditions of said power inverter module and said electric motor assembly and operative to provide temperature data indicative of said temperature conditions; and
a control module operative to monitor data provided by said temperature sensors, and modulate the operation of said electric motor assembly by attenuating a maximum allowable torque of the electric motor assembly based on the monitored temperature conditions comprising imposing a maximum continuous torque function upon a torque output of said electric motor assembly; and
wherein said maximum continuous torque function reduces said maximum torque output of said electric motor assembly in response to increasing temperature conditions such that said maximum torque output of said electric motor assembly is reduced to zero before a critical temperature condition is attained.

7. The method of claim 1, wherein said environmental temperature is analyzed and said variable maximum continuous torque function is selectively utilized based upon whether said environmental temperature is high.

8. The method of claim 1, wherein said environmental temperature is analyzed and said variable maximum continuous torque function is selectively utilized based upon whether said environmental temperature is low.

* * * * *